United States Patent [19]
Matthis

[11] 3,762,617
[45] Oct. 2, 1973

[54] APPARATUS FOR STEPWISE TRANSPORT OF WEBS OF SYNTHETIC PLASTIC MATERIAL OR THE LIKE

[75] Inventor: Hans Matthis, Kleinheppach, Germany

[73] Assignee: Hofliger & Karg, Waiblingen, Germany

[22] Filed: Mar. 22, 1972

[21] Appl. No.: 237,130

[30] Foreign Application Priority Data
Mar. 24, 1971 Germany.................. P 21 14 306.6

[52] U.S. Cl....................... 226/32, 226/34, 226/53, 226/157
[51] Int. Cl............................................. B65h 23/18
[58] Field of Search........................ 226/32, 34, 157, 226/170, 53; 198/135; 53/51

[56] References Cited
UNITED STATES PATENTS
2,821,388  1/1958  Crane et al. ........................... 226/32
3,635,387  1/1972  Gallistell et al..................... 226/157
3,610,499  10/1971  Gallistell et al..................... 226/157

Primary Examiner—Allen N. Knowles
Attorney—Michael S. Striker

[57] ABSTRACT

Apparatus for stepwise transport of a series of interconnected synthetic thermoplastic containers employs an endless conveyor the upper stretch of which supports and advances the containers past a set of detectors which scan the position of the nearest container during each interval of dwell of the conveyor. The conveyor is driven by a chain which is trained over a gear serving to rotate one sprocket wheel of the conveyor by means of a one-way clutch. The chain is moved lengthwise back and forth by an oscillatory lever and a helical spring. When the spacing between successive containers changes, signals from the detectors cause a deflector to flex the chain with the result that the distance through which the conveyor is advanced is either increased or reduced until the next-following container which moves into the range of the detectors occupies an optimum position. The deflector can be actuated by a fluid-operated motor.

10 Claims, 1 Drawing Figure

PATENTED OCT 2 1973
3,762,617
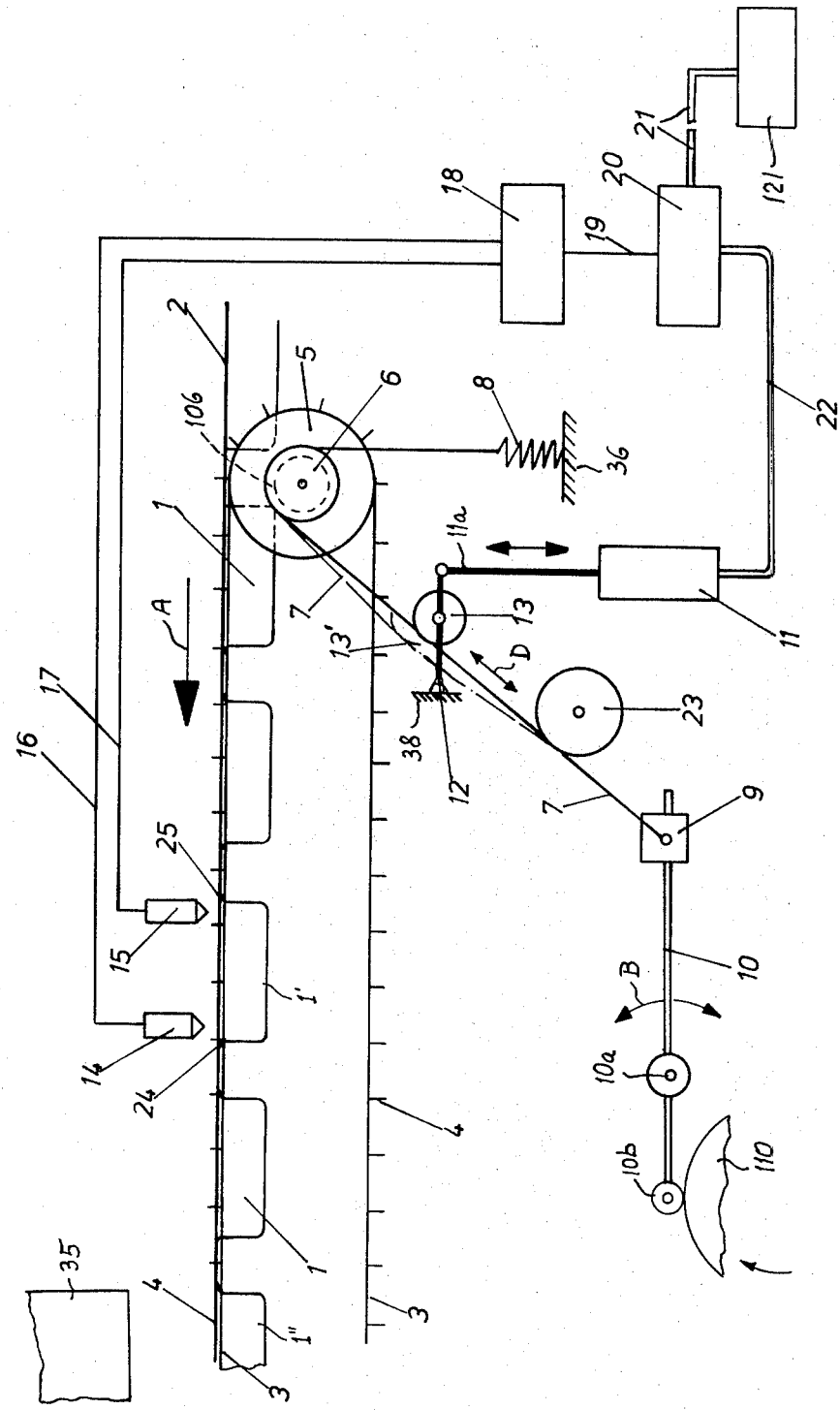

APPARATUS FOR STEPWISE TRANSPORT OF WEBS OF SYNTHETIC PLASTIC MATERIAL OR THE LIKE

BACKGROUND OF THE INVENTION

The present invention relates to apparatus for transporting a series of normally equidistant commodities in stepwise fashion. More particularly, the invention relates to improvements in apparatus which can be used for stepwise transport of normally (but not necessarily) equidistant portions of strips, webs or the like into register with stationary treating or processing stations. For example, the apparatus of the present invention can be utilized to transport a series of normally equidistant interconnected plastic receptacles or containers into register with one or more stations where the containers can receive charges of a material which is to be confined therein, where the filled containers can be provided with covers which are sealed thereto to airtightly confine the charges, and where the filled and sealed containers can be separated from each other.

In packing apparatus for introduction of foodstuffs or other substances into successive containers, particularly into containers which are obtained by deep drawing or analogous deformation of longitudinally spaced equidistant portions of a web or strip of synthetic thermoplastic material, each of a series of successive containers must be moved into accurate register with at least one but normally two, three, four or more processing stations at which the containers are subjected to one or more treatments which may involve sterilizing, filling, capping, sealing, providing with indicia, separating from each other and/or others. A very important prerequisite for proper operation of such packing apparatus (particularly as concerns avoiding losses in material which is to be introduced into containers and proper sealing of filled containers) is that each container be brought into accurate register with the instrumentalities at each treating or processing station. For example, it is important to insure that a container which is in the process of receiving a charge of liquid and/or solid material be maintained in accurate alignment with the outlet or outlets of a filling device. The same holds true for the sealing station where the freshly filled containers must be provided with covers which are thereupon bonded to the web by resorting to one or more welding electrodes or the like, and also for the cutting or severing station where the foremost filled and sealed container or containers are separated from the next-following containers to be introduced into cartons or the like.

Accurate positioning of such containers with reference to devices at various processing stations often presents serious problems, especially if the web which is formed with or which carries the containers consists of synthetic thermoplastic material. In the manufacture of such webs, certain stresses are "frozen" into their material. During transport through the packing apparatus, spaced portions of the web are often subjected to more or less pronounced heating action so that such spaced portions undergo more or less pronounced expansion with the result that the distance between neighboring containers frequently varies within a wide range. This prevents the presently known transporting systems of such apparatus of insuring that each of a series of successive containers on or in a web will invariably move into accurate register with one two or more successive processing stations.

It was already proposed to compensate for such unpredictable variations in the spacing between successive containers or analogous commodities by mounting the processing stations on suitable carriages which are movable lengthwise of the path for the web and by providing the apparatus with suitable detectors which determine the positions of nearest containers and produce signals which are used to adjust the respective stations so as to move their instrumentalities into register with the adjacent containers. Such apparatus failed to gain widespread acceptance in the packing industry because of their complexity as well as high initial and maintenance cost, especially if an apparatus comprises a large number of stations.

SUMMARY OF THE INVENTION

An object of the invention is to provide a simple, compact, reliable and rugged apparatus which can automatically compensate for eventual variations in mutual spacing of a series of successive commodities, such as a series of deep-drawn receptacles or containers which are formed in an elongated web or strip of synthetic plastic material.

Another object of the invention is to provide the apparatus with novel and improved means for automatically adjusting the drive means which moves a series of commodities stepwise if the position of a commodity during an interval of dwell between successive stepwise advances deviates from a predetermined optimum position.

A further object of the invention is to provide novel and improved adjustable drive means for an endless conveyor or analogous carrier means for a succession of normally equidistant commodities whose mutual spacing is subject to unpredictable variations.

An additional object of the invention is to provide the adjusting means with novel and improved means for influencing the operation of the drive means.

The invention is embodied in an apparatus for stepwise transport of a series of normally equidistant commodities whose mutual spacing is subject to variations. The apparatus comprises an endless conveyor or analogous carrier means for advancing a series of commodities along a predetermined path, adjustable drive means which is operative to move the carrier means stepwise in a predetermined direction through distances of variable length (such distances are normally proportional to the expected mutual spacing of successive commodities), a plurality of signal generating detector means adjacent to a portion of the path for scanning the positions of successive commodities during the intervals of idleness of the carrier means and for producing signals when the position of a commodity occupying the aforementioned portion of the path deviates from a predetermined position, and adjusting means for adjusting the drive means in response to signals from the detector means.

The drive means preferably comprises an elongated chain or an analogous flexible element which may but need not be finite length, and means for moving the flexible element lengthwise. The adjusting means then preferably comprises an idler roller, an idler gear, a sprocket wheel, a runner or an analogous output element which is actuatable in response to signals from the detector means to thereby deflect the flexible element whereby the deflection may result in a shortening of the distance through which the carrier means advances a series of commodities or in a lengthening of such distance, depending upon whether the signals from the detector means indicate that the position of the scanned commodity lags behind or is beyond the predetermined position as considered in the direction of stepwise movement of the carrier means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary partly diagrammatic side elevational view of an apparatus which embodies the invention.

DESCRIPTION OF THE PREFERRED EMBODIMENTS

The drawing illustrates a portion of a packing apparatus which is utilized to introduce measured quantities of a material into successive containers or receptacles 1 formed by deep drawing of longitudinally spaced equidistant portions of a web or strip 2 of synthetic thermoplastic material. The web 2 must be transported stepwise in the direction indicated by arrow A so as to place successive containers 1 into register with a series of stations of which only one (namely, the station 35) is shown in the drawing. The station 35 is assumed to accommodate a suitable filling device (not specifically shown) which introduces into containers 1 measured quantities of a flowable material, e.g., jam, honey or the like.

The carrier means for directly supporting and advancing the web 2 in stepwise fashion comprises an endless conveyor here shown as including a chain 3 which is trained over several rotary sprocket wheels 5 (only one shown) and is provided with a plurality of equidistant outwardly extending pin-shaped projections 4. The projections 4 may serve to spear one or both marginal portions of the web 2 so that the latter is compelled to share all lengthwise movements of the upper stretch of the chain 3. The adjustable drive means for intermittently rotating the illustrated sprocket wheel 5 in a counterclockwise direction, as viewed in the drawing, comprises a second rotary sprocket wheel or gear 6 which is coaxial with the sprocket wheel 5 and is rotatable back and forth by a chain or an analogous flexible element 7 of finite length. The gear 6 transmits torque to the sprocket wheel 5 through the intermediary of a one-way clutch 106 which is effective when the gear 6 rotates anticlockwise but is ineffective when the gear 6 is caused to rotate in a clockwise direction. One end portion of the chain 7 is attached to a resilient element here shown as a helical spring 8 which is anchored in a stationary part 36 of the packing apparatus and which stores energy when the chain 7 is moved lengthwise to rotate the gear 6 in a counterclockwise direction. The other end portion of the chain 7 is connected with an adjustable coupling element 9 which is mounted on an oscillatable driving lever 10. The latter is fulcrumed at 10a and has a roller follower 10b which tracks a rotary cam 110. The cam 110 cooperates with the spring 8 to pivot the lever 10 back and forth (as indicated by the double-headed arrow B) whereby the chain 7 moves lengthwise back and forth in first and second directions and rotates the sprocket wheel 5 through the intermediary of the gear 6 when the latter is caused to rotate anticlockwise. The coupling element 9 is adjustable lengthwise of the respective arm of the driving lever 10 so as to allow for rapid and convenient conversion of the packing apparatus for stepwise transport of different types of webs 2, i.e., of webs wherein the containers 1 or analogous commodities are nearer to or more distant from each other. For example, the coupling element 9 may be separably secured to the driving lever 10 by a screw or the like, and the driving lever may be provided with a suitably graduated scale to facilitate adjustments of the coupling element 9 for stepwise transport of a given type of web. The adjusting means for automatically compensating for eventual deviations of the mutual spacing of successive containers 1 from a predetermined distance comprises an output element or deflector 13 (e.g., a sprocket wheel, a gear, a roller or a runner) which is movable by the piston rod 11a of a motor here shown as a fluid-operated cylinder 11. The latter is connected with a source 121 of pressurized fluid (e.g., compressed air) by means of hoses or conduits 21, 22. The two hoses are connected to each other by a valve 20 (e.g., a solenoid-operated valve) which controls the admission of pressurized fluid into the lower chamber of the cylinder 11. When the solenoid of the valve 20 is energized in response to a signal which is transmitted by a conductor 19, the conduit 21 can admit pressurized fluid into the conduit 22 so that the piston rod 11a moves upwardly, as viewed in the drawing, and causes the deflector 13 to engage and flex the chain 7 at a point between the gear 6 and the coupling element 9.

The deflector 13 is assumed to be a roller or sprocket wheel which is rotatable on a lever 12. One end of the lever 12 is pivotably secured to the frame of the packing apparatus, as at 38, and its other end is articulately connected with the piston rod 11a.

The apparatus further comprises at least two detectors 14, 15 (e.g., photoelectric cells) which are adjacent to a portion of the path for web 2 and are spaced apart by a distance which is preferably slightly less than the normal length of a container 1. The outputs of the detectors 14, 15 are connected with a suitable evaluating circuit 18 by means of conductors 16, 17, and the output of the circuit 18 is connected with the solenoid of the valve 20 (conductor 19).

An idler sprocket wheel 23 is mounted in the frame of the apparatus between the coupling element 9 and deflector 13 to insure that the position of the point where the left-hand portion of the chain 7 moves away from the gear 6 remains unchanged.

The parts 6, 7, 9, 10, 110 constitute an adjustable drive means for the conveyor or carrier 3–5, and the parts 11, 13, 18, 20 constitute a means for adjusting the drive means in response to signals from the detectors 14, 15.

THE OPERATION

The cam 110 is rotated by the prime mover of the packing apparatus at a selected speed so as to process a desired number of containers 1 or analogous commodities per unit of time. As the cam 110 rotates, it causes the roller follower 10b to oscillate the driving lever 10 whereby the lever 10 cooperates with the coupling element 9 and spring 8 to move the chain 7 lengthwise back and forth as indicated by the double-headed arrow D. When the lever 10 pivots in a clockwise direction, as viewed in the drawing, the chain 7 causes the gear 6 to rotate the sprocket wheel 5 through the intermediary of the clutch 106 so that the upper stretch of the chain 3 advances with the web 2 in the direction indicated by the arrow A. The extent of stepwise movement of the chain 3 is determined by the selected distance between the coupling element 9 and the fulcrum 10a for the driving lever 10; such distance is a function of the normal distance between successive containers 1.

The drawing shows the web 2 in a position of rest or dwell between two successive stepwise movements. The system including the detectors 14, 15, evaluating circuit 18, valve 20, cylinder 11 and deflector 13 is idle because the container 1' which happens to be adjacent to the detectors 14, 15 dwells in an optimum or predetermined position, i.e., the container 1" which is located ahead of the scanned container 1' is assumed to be in accurate register with the filling device at the station 35. As shown, the lower end portions of the detectors 14, 15 are inwardly adjacent to the respective transversely extending leading and trailing marginal or edge portions 24, 25 of the container 1' so that neither of these detectors furnishes a signal to the evaluating circuit 18. The detectors 14, 15 are designed, connected in circuit with 18 and mounted in such a way that they respectively produce signals if they happen to register with the edge portions 24, 25 of the nearest container when the chain 3 is at a standstill.

If the chain 3 is arrested while a light beam produced by the light source of the detector 14 is being reflected on the leading edge portion 24 of the adjacent container 1, the reflected light beam impinges on the photosensitive element of the detector 14 and the latter transmits to the evaluating circuit 18 a signal by way of the conductor 16. The circuit 18 energizes the solenoid of the valve 20 by way of the conductor 19 so that the valve 20 opens and admits a pressurized fluid into the cylinder 11. The piston rod 11a then pivots the lever 12 in a counterclockwise direction, as viewed in the drawing, so that the deflector 13 moves to the position 13' and deflects or deforms the chain 7 while the driving lever 10 pivots in a first or clockwise direction. Consequently, the extent of lengthwise movement of the chain 7 in a first direction, namely, against the opposition of the spring 8, exceeds the normal extent of such movement so that the chain 3 is advanced through a slightly greater distance in order to insure that the leading edge portion 24 of the next-following container or containers 1 will be located to the left of the detector 14 when the forward movement of the chain 3 is terminated. The deflecting action of the member 13 is maintained until the leading edge portion 24 of a container 1 moves beyond the detector 14.

If the chain 3 is arrested at a time when the trailing edge portion 25 of a container 1 is located in the path of the light beam issuing from the detector 15, the latter transmits a signal by way of the conductor 17 so that the evaluating circuit 18 energizes the solenoid of the valve 20 in order to move the deflector 13 to the position 13' but at a time when the lever 10 pivots in a second or counterclockwise direction, i.e., while the gear 6 is rotated clockwise. The deflector 13 is retracted while the driving lever 10 thereupon pivots in a clockwise direction so that the length of stepwise movement of the chain 3 is reduced with the result that the trailing edge portion 25 of the next container or containers 1 assumes the position shown in the drawing and does not cause the detector 15 to furnish a signal to the evaluating circuit 18. Thus, and since the deflector 13 is retracted during forward transport of the chain 3, the extent to which the chain 7 is moved against the opposition of the spring 8 is less than normally and the extent of forward movement of the chain 3 is reduced accordingly. Such operation is repeated as often as necessary in order to insure that the trailing edge portion 25 of successive containers 1 do not register with the detector 15 when the chain 3 is at a standstill.

The detectors 14, 15 and the evaluating circuit 18 can be readily constructed and assembled in such a way that the detector 14 produces signals only in response to detection of leading edge portions 24 and that the detector 15 produces signals only in response to detection of trailing edge portions 25 on the containers 1. The distance between the illustrated detectors 14, 15 is slightly less than the normal length of a container, i.e., slightly less than the distance between the leading and trailing edge portions 24, 25 of a container.

The improved apparatus can be modified in a number of ways without departing from the spirit of the invention. For example, the evaluating circuit 18 can be operatively connected with the coupling element 9 so that the latter is automatically adjusted in one direction (e.g., toward the pivot 10a) in response to a signal from the detector 14 and in the opposite direction in automatic response to a signal from the detector 15. Furthermore, the cylinder 11 can be replaced with an electromagnet or other suitable motor means which controls the movements of the output element 13 or an analogous deflector. All such modifications will be readily understood upon perusal of the preceding description.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In an apparatus for stepwise transport of a series of normally equidistant receptacles which form part of a web consisting of synthetic thermoplastic material, whose mutual spacing is subject to variations and which are to be moved seriatim into register with at least one station, a combination comprising carrier means for advancing said series of receptacles along a predetermined path, said carrier means including a conveyor for said web; adjustable drive means operative to move said conveyor stepwise in predetermined direction through distances of variable length, comprising an elongated flexible element having first and second ends, a stationary part, resilient means connecting said first end to said stationary part and a driving member connected with said second end and cooperating with said resilient means to move said flexible element in first and second directions through distances corresponding to the normal spacing between said receptacles whereby said web moves in said predetermined direction in response to each movement of said flexible element in said first direction; a plurality of signal generating detector means adjacent to a portion of said path for scanning the positions of successive receptacles during the intervals of idleness of said conveyor and for producing signals when the position of a receptacle occupying said portion of said path deviates from a predetermined position; and adjusting means for adjusting said drive means in response to said signals, including an output element actuatable in response to said signals to deflect said flexible element not later than or subsequent to a movement of said flexible element in said first direction.

2. A combination as defined in claim 1, wherein said flexible element is a chain.

3. A combination as defined in claim 1, wherein said output element is a rotary element.

4. A combination as defined in claim 1, wherein said output element is a runner.

5. A combination as defined in claim 1, wherein said conveyor is idle during movement of said flexible element in said second direction, said adjusting means being arranged to move said output element against said flexible element during movement of said flexible element in said first direction when at least one of said detector means generates signals indicating that the position of the receptacle occupying said portion of said path lags behind said predetermined position.

6. A combination as defined in claim 1, wherein said conveyor is idle during movement of said flexible element in said second direction, said adjusting means being arranged to move said output element against said flexible element during movement of said flexible element in said second direction and to disengage said output element from said flexible element during the next-following movement of said flexible element in said first direction when at least one of said detector means generates signals indicating that the position of the receptacle occupying said portion of said path is beyond said predetermined position.

7. A combination as defined in claim 1, wherein said adjusting means further comprises fluid-operated motor means for moving said output element in response to said signals.

8. A combination as defined in claim 1, wherein the length of each receptacle, as considered in said predetermined direction, at least approximates a predetermined length and said detector means comprises a pair of detectors separated from each other by a distance which is less than said predetermined length.

9. A combination as defined in claim 1, wherein said conveyor has an upper stretch arranged to support said series of receptacles and a rotary driven member, said drive means further comprising a second rotary member coaxial with said driven member and one-way clutch means interposed between said rotary members, said flexible element being trained over said second rotary member and said second rotary member being arranged to rotate said driven member by way of said clutch and to thereby move said upper stretch in said predetermined direction in response to movement of said flexible element in said first direction.

10. A combination as defined in claim 1, further comprising means for adjustably coupling said oscillatable driving member with said second end of said flexible element.

* * * * *